United States Patent
Bauer et al.

[11] Patent Number: 5,988,759
[45] Date of Patent: Nov. 23, 1999

[54] BELT INTEGRAL SEAT OF A MOTOR VEHICLE WITH A BACK REST, A NECK REST AND A DEVICE FOR THE SAFETY BELT GUIDANCE

[75] Inventors: Heinz Bauer; Burckhard Becker; Ernst-Reiner Frohnhaus, all of Solingen, Germany

[73] Assignee: C. Rob. Hammerstein GmbH & Co. KG, Solingen, Germany

[21] Appl. No.: 09/056,084

[22] Filed: Apr. 7, 1998

[30] Foreign Application Priority Data

Apr. 26, 1997 [DE] Germany .......................... 197 17 666

[51] Int. Cl.$^6$ .................................................. B60R 22/26
[52] U.S. Cl. ........................................... 297/483; 297/410
[58] Field of Search ..................................... 297/391, 468, 297/410, 483, 484; 280/808

[56] References Cited

U.S. PATENT DOCUMENTS

| | | | |
|---|---|---|---|
| 5,330,228 | 7/1994 | Krebs et al. | 280/808 |
| 5,390,982 | 2/1995 | Johnson et al. | 297/483 X |
| 5,599,070 | 2/1997 | Pham et al. | 297/483 |
| 5,658,048 | 8/1997 | Nemoto | 297/410 |
| 5,658,051 | 8/1997 | Vega et al. | 297/483 |
| 5,722,732 | 3/1998 | Haldenwanger | 297/483 |
| 5,829,841 | 11/1998 | Pywell et al. | 297/483 X |

FOREIGN PATENT DOCUMENTS 404285506  10/1992  Japan ..................................... 297/483

Primary Examiner—Peter R. Brown
Attorney, Agent, or Firm—John Lezdey & Assoc.

[57] ABSTRACT

The structure relates to a belt integral seat of a motor vehicle with a back rest, which has a back rest frame, onto which a carrier of a neck rest and a device for the safety belt guidance is arranged at the top. The device for a safety belt guidance is attached to the carrier. The carrier is located between the device for a safety belt guidance and the neck rest.

9 Claims, 2 Drawing Sheets

BELT INTEGRAL SEAT OF A MOTOR VEHICLE WITH A BACK REST, A NECK REST AND A DEVICE FOR THE SAFETY BELT GUIDANCE

FIELD OF THE INVENTION

The invention relates to a safety belt integral seat of a motor vehicle with a back rest, which has a back rest frame, onto which a carrier of a neck rest and a device for the safety belt guidance is arranged at the top.

BACKGROUND OF THE INVENTION

A device for a safety belt guidance is usually provided above the upper cross piece of the back rest frame of the neck rest with belt integral seats. According to the state of the art it is attached at its own support piece. Because of this, there is an additional support piece next to the carrier of the neck rest. Due to that, the construction as a whole has a higher expenditure and also a higher weight.

This is where the invention sets in. It is the object of the invention to further develop belt integral seats of the above mentioned kind in such a way that a most favorable attachment possible of the device for a safety belt guidance is stated and that with a development the possibility is offered, to adjust the height of the device for a safety belt guidance in a favorable combination with the height of the support cushion of the neck rest.

SUMMARY OF THE INVENTION

Based on the belt integral seat of the above mentioned kind this object is realized in such a way that the device for a safety belt guidance is also attached to the carrier and that the carrier is located between the device for a safety belt guidance and the neck rest.

According to the invention the device for a safety belt guidance is attached to the carrier, which carries the neck rest. It is hereby arranged at that side of the carrier, which is opposite of the support cushion of the neck rest. Expressed in other words, the carrier is located between the neck rest and the device for a safety belt guidance. By this an additional support piece is not necessary.

In a preferred development the carrier has a guidance for a height adjustment of the neck rest. Furthermore, a cross-piece of the neck rest, which carries the support cushion, is directly connected with the device for a safety belt guidance. Due to that the height of the support cushion and the device for a safety belt guidance can be adjusted and locked mutually in the carrier. By this the height of the belt guidance is changed in accordance to the height of the support cushion. A passenger with a larger seat size will push the neck rest further up, and the device for a safety belt guidance is also pushed up accordingly. A passenger with a smaller seat size will push the neck rest further down on the contrary, the same applies to the position of the device for a safety belt guidance.

In a further preferred development, the device for a safety belt guidance has a device for a guide block, which encompasses the belt, which can easily be joined with a receiver unit of the remaining device for a safety belt guidance, especially it can be put into the same or it can be slipped onto it. By this, the assembly is simplified. Especially, the guide block can be captively provided at the belt by the belt manufacturer already, when assembling the belt, it is only connected with the receiver unit. By this a precise guidance of the belt is achieved in the device for a safety belt guidance. This would not be possible for example, if a snap-in lock of the belt had to be put through the guide block when assembled, which would lead to large measures of the belt guidance openings of the guide block. A closed belt guidance opening of the guide block is possible that way.

In a further, preferred embodiment the support cushion of the neck rest is carried by a cross-piece in a one-sided manner, which extends far from the carrier into the direction of the upper cross-piece of the back rest frame. Hereby, the carrier is arranged distinctly outside the center of the upper cross-piece. Due to that the device for a safety belt guidance can be provided in the direct vicinity of the carrier.

Further advantages and characteristics of the invention derive from the other claims as well as the following description of a non-restrictive embodiment of the invention, which is demonstrated further with regard to the drawing.

DESCRIPTION OF THE PREFERRED EMBODIMENTS

Figure 1:
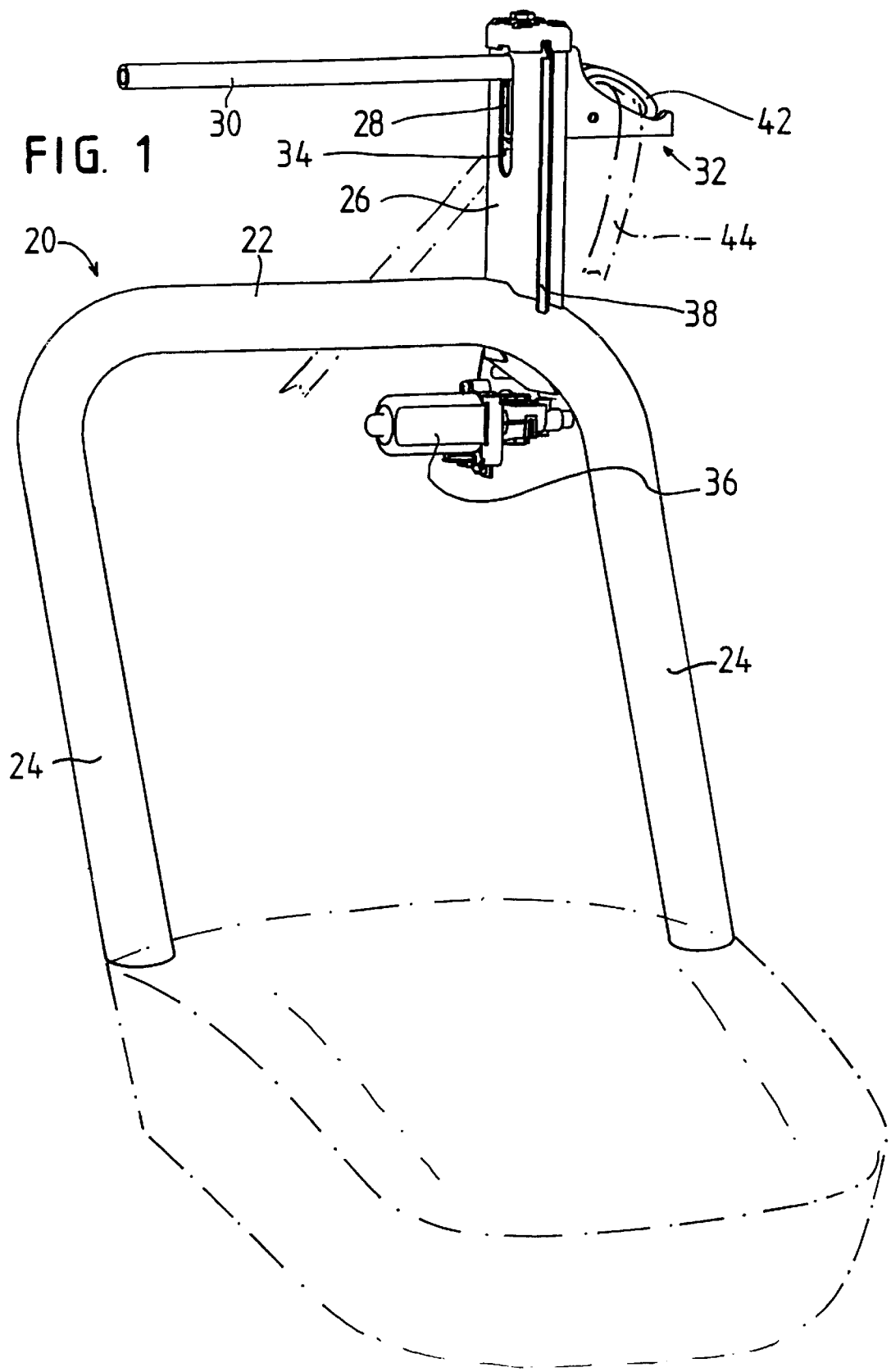
FIG. 1: a perspective illustration of a schematic illustration of a belt integral seat with an area embodied in detail illustrating the device for a safety belt guidance, the carrier and the neck rest tube.

As can be seen from FIG. 1, the motor vehicle seat has a back rest, which has a back rest frame 20. In the illustrated embodiment, it is produced of a piece of steel tube, which is bent in a U-shape. It has an upper cross-piece 22 and two side legs 24. At the upper cross-piece a carrier 26 is arranged. It essentially extends in the extension of the right, side leg, but in contrary to the same, it is misaligned to the center of the back rest frame 20, the misalignment amounts to about ⅓ of the entire width of the back rest frame 20. The carrier 26 is not located exactly on the level of the back rest frame 20, it is much rather tilted forward slightly by 10 to 20 degrees, for example.

The carrier is manufactured of a rectangular tube. It has about 30% of the length of the back rest frame 20. In its interior, a sliding block 28 is movably arranged. On one hand a neck rest tube 30 is attached and on the other a device for a safety belt guidance 32. The carrier is aligned in such a way that two side walls extend crosswise to the upper cross piece 22, and especially in an angle of 90 degrees. In one of the side walls, a respective longitudinal slot for the neck rest tube 30 is embodied. In the opposite side wall a respective longitudinal slot for the device for a safety belt guidance 32 is provided, this longitudinal slot is not illustrated in FIG. 1, but can be recognized in FIG. 2.

Figure 3:
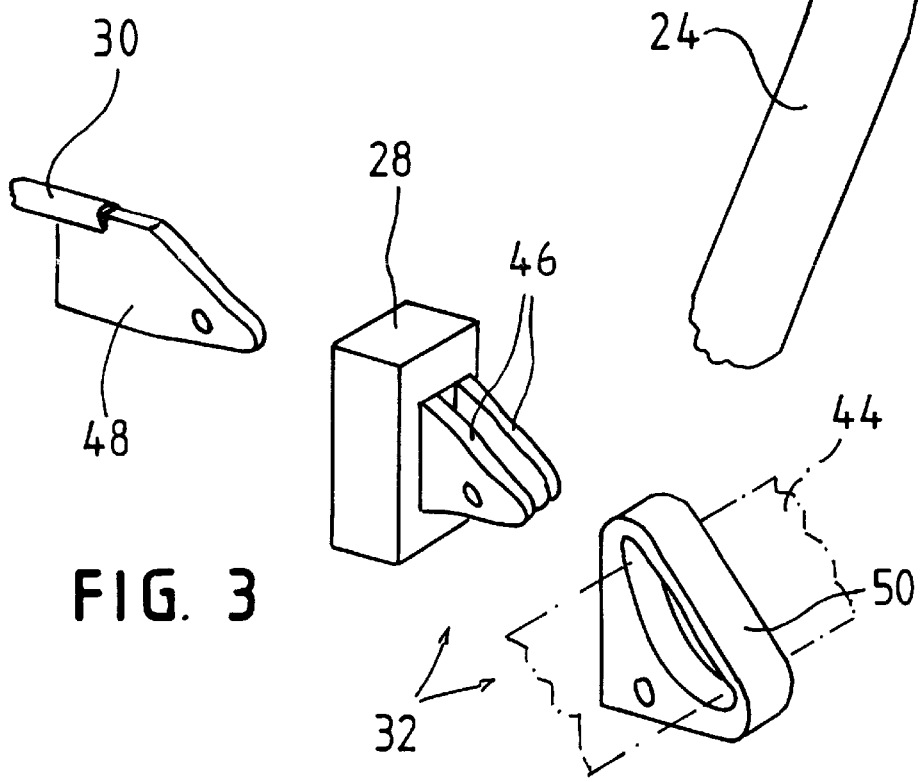

In the manner known already, the neck rest tube 30 receives a neck rest cushion, which is not illustrated further here, it is already known. With reference to FIG. 3, the device for a safety belt guidance will be referred to later.

The carrier 26 is open to the bottom. At the top it is closed by a cap or a similar device. Below the carrier 26, an electric motor 36 with a flanged step-down gear system is attached to the back rest frame 20. It drives a spindle 38, which is located at the side of the carrier 26 and which practically extends over the entire length of the same. At the sliding block 28, a nut is arranged, which is in mesh with this spindle 38. By turning the spindle 38, the sliding block 28 can be driven up and down. FIG. 1 illustrates the highest possible position.

Figure 2:
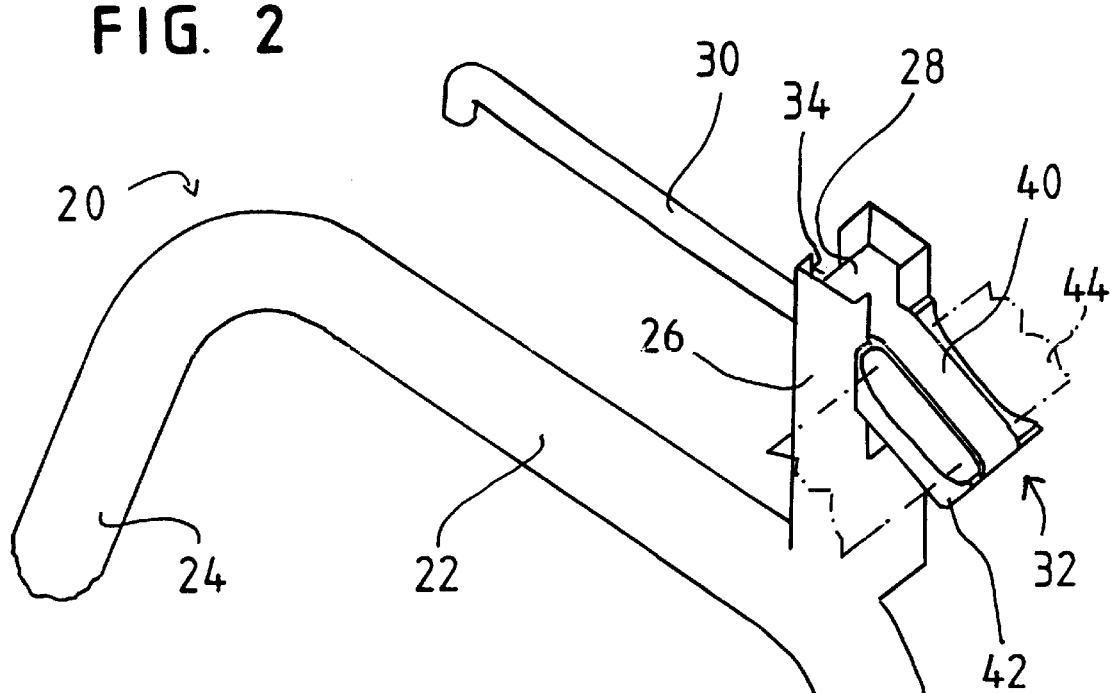
FIG. 2: a perspective illustration similar to FIG. 1 for the upper area of a back rest frame with another embodiment of the carrier, the device for a safety belt guidance and of the neck rest tube and, FIG. 3: an assembly picture of a guide block, a sliding block and a section of a neck rest tube with the matching support.

Also in the embodiment according to FIG. 2, the back rest frame 20 is manufactured of a bent metal tube with a U-shape. The carrier 26 is welded on the upper cross piece 22 with a slight tilt forward, it is also produced of a tube with a square profile. The neck rest tube 30 is directly attached to the sliding block 28, the same has an arm 40, which essentially extends in the opposite direction to the neck rest tube 30, for the embodiment of the device for a safety belt guidance. Below this arm is a counter piece 42, during the process of assembling it is connected with the sliding block 28, especially with its arm 40. Between the arm 40 and the counter piece 42, a longish passage for a belt band 44 is embodied, which is captively encompassed at the arm 40 and the sliding block 42 after joining.

FIG. 3 illustrates another possible embodiment of the sliding block 28, of the device for a safety belt guidance 32 and the neck rest tube 30 with a holding device. The sliding block 28 is an essentially prismatic body, which can be movably guided in the inside of a tube with a rectangular profile. At the sliding block 28 two projections 46, which have a certain distance and a catch shape, are embodied, they extend away from the neck rest tube 30. The neck rest tube 30 is rigidly connected with a holding device 48, which also embodies an essentially catch shape projection of the same measure. This can be pushed into the sliding block 28 by a passage, which is provided in the sliding block 28, in such a way, that the three catch shape projections lay next to each other and that the drill-hole, which is provided in them, is in alignment with those of the other projections. Onto these three projections a guide block 50 is slipped, it also has a drill hole, which extends crosswise. By means of a suitable attachment, for example a dowel pin or a screw with a nut, the guide block is connected with the three projections. By this the neck rest tube 30 is fastened on one hand, and on the other hand the device for a safety belt guidance 32 is embodied.

The guide block 50 is connected with the belt band 44 right from the beginning, it is therefore already on the belt and is delivered by the belt manufacturer together with the finished belt. It cannot be removed from the same without destruction.

The two catch shape projections 46 and the guide block 50 constitute the device for a safety belt guidance 32 in the embodiment according to FIG. 3.

Preferably, the sliding block 28 is produced of synthetic material. The motor vehicle seat according to FIG. 1 is suitable for the driver's seat of a left wheel drive motor vehicle. The carrier 28 is in the vicinity of the outside of the motor vehicle, especially of the center string piece, when the motor vehicle seat is already assembled. The neck rest tube 30 extends to the center of the motor vehicle accordingly.

What is claimed is:

1. A safety belt integral seat of a motor vehicle comprising, in combination,
    a). a backrest having a back rest frame, said back rest frame having an upper cross piece;
    b). a carrier fixed to said back rest frame extending upwards from said upper cross piece and having a safety belt guidance;
    c). a sliding block slidingly attached to said carrier and cooperating with said safety belt guidance, so that said sliding block is adjustable in height relative to said carrier, said sliding block having two opposite side faces;
    d). a neck rest rigidly connected to said sliding block at one side face thereof, and a means for said safety belt guidance having an upper deflectance point for said safety belt, said means for said safety belt guidance being rigidly attached to said sliding block at the opposite side face thereof, said sliding block being between said neck rest and said safety belt guidance and said neck rest and said safety belt guidance being mutually adjustable in height in the guidance of said carrier.

2. The safety belt integral seat according to claim 1, wherein said carrier extends upwards from said upper cross piece of said back rest frame at an angle of about 90 degrees.

3. The safety belt integral seat according to claim 2, wherein said carrier extends upwards from said upper cross piece in a plane which is defined by said back rest frame.

4. The belt integral seat according to claim 1, wherein for said height adjustment of said neck rest a slot is provided in said carrier and said neck rest further comprising a neck rest tube and a support cushion, said neck rest tube extending from said sliding block through said slot and carrying said support cushion.

5. The belt integral seat according to claim 1, wherein said means for safety belt guidance has a guide block, said guide block encompassing said safety belt.

6. The belt integral seat according to claim 5, wherein said sliding block is provided with a receiving unit for detachably receiving said guide block, said receiving unit being arranged at said opposite side face of said sliding block and having means for detachably receiving and holding said guide block.

7. The safety belt integral seat according to claim 5, wherein said guide block comprises a synthetic plastic material.

8. The safety belt integral seat according to claim 1, including motor means attached to said sliding block for pulling in said neck rest and said device for safety belt guidance when the back rest is tilted forward.

9. The safety belt integral seat according to claim 1, wherein said neck rest comprises a neck rest tube and wherein said neck rest has a support cushion that is carried by said neck rest tube in a one-sided manner.

* * * * *